United States Patent [19]

Nishioka

[11] Patent Number: 4,492,440

[45] Date of Patent: Jan. 8, 1985

[54] FINDER OPTICAL SYSTEM

[75] Inventor: Kimihiko Nishioka, Hachiouji, Japan

[73] Assignee: Olympus Optical Co., Ltd., Tokyo, Japan

[21] Appl. No.: 343,363

[22] Filed: Jan. 27, 1982

[30] Foreign Application Priority Data

Jan. 31, 1981 [JP] Japan ................. 56-12224

[51] Int. Cl.³ .................................. G02B 25/00
[52] U.S. Cl. ......................... 350/445; 350/410
[58] Field of Search ......................... 350/445, 410

[56] References Cited

U.S. PATENT DOCUMENTS

| | | | |
|---|---|---|---|
| 1,712,112 | 5/1929 | Keuffel | 350/445 |
| 2,837,969 | 6/1958 | Muller | 350/410 |
| 4,286,844 | 9/1981 | Nagler | 350/410 |

FOREIGN PATENT DOCUMENTS

| | | | |
|---|---|---|---|
| 0680381 | 2/1964 | Canada | 350/445 |
| 1010226 | 11/1965 | United Kingdom . | |

*Primary Examiner*—John K. Corbin
*Assistant Examiner*—Rebecca D. Gass
*Attorney, Agent, or Firm*—Cushman, Darby & Cushman

[57] ABSTRACT

A finder optical system wherein a field mask is arranged in a position near to an eyepiece from a field lens so that a distortionless image of the field mask may be observed. The field mask can be provided directly on the peripheral side of the field lens.

4 Claims, 8 Drawing Figures

FINDER OPTICAL SYSTEM

BACKGROUND OF THE INVENTION (a) Field of the Invention

This invention relates to a finder optical system comprising a field lens, field mask and eyepiece.

(b) Description of the Prior Art

A finder for photographic cameras is provided with a mask showing a photographed range, that is, a field mask. Such mask is generally rectangular. In a conventional finder device, the image of the mask may be seen as distorted.

For example, a finder for conventional single-lens reflex photographic cameras is of such formation as is shown in FIG. 1. The reference numeral 1 denotes a picture taking objective. A light having passed through this picture taking objective is reflected by a quick return mirror 2 arranged in front of a film face 3 and arrives on a focussing glass on which an image is formed. Further, the light passes through a field lens 6 and pentagonal roof prism 7 and is observed with an eyepiece 8. In such finder optical system, the light from the mask 4 showing a photographed range reaches the eyepiece through the field lens 6 and is observed. Therefore, if there is a distortion in the eyepiece system including the field lens 6, the image of the mask will be seen as distorted to be bobbin-shaped, because, as shown in FIG. 2, if the image magnified by the eyepiece is considered to be an object and the real image 9 is considered to be an object image and is considered as reversely traced from the side of the exit pupil 10, as the eyepiece 8 and field lens 6 are both convex lenses, a strong negative distortion will occur and, as the ray height of the principal ray is low in the eyepiece but is high in the field lens, the distortion will occur mostly in the field lens. In fact, as the ray proceeds toward the eyepiece 8 from the real image 9 side, the finder optical system will have a strong positive distortion and such rectangular mask as in FIG. 3 will be seen to be bobbin-shaped as in FIG. 4 to give an ugly queer feeling.

SUMMARY OF THE INVENTION

In view of the above mentioned point, a primary object of the present invention is to provide a finder optical system wherein a distortionless field mask image can be observed.

According to the present invention, this object is attained by arranging a field mask in a position near to an eyepiece from a field lens.

According to a preferred formation of the present invention, a field mask is set between a field lens and roof prism. The field mask may be provided directly on the peripheral side on the front side surface or rear side surface of the field lens so that the distortion of the field mask image may be favorably removed.

DESCRIPTION OF THE PREFERRED EMBODIMENTS

Figure 5:
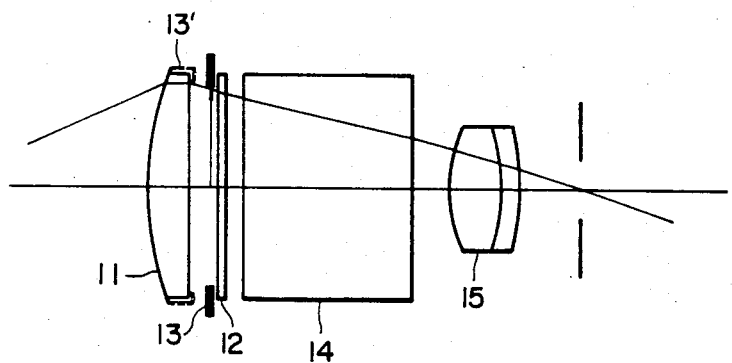
FIG. 5 is a view showing a schematic formation of a finder optical system according to the present invention.

FIG. 5 shows a schematic arrangement of a finder optical system of the present invention. The reference numeral 11 denotes a field lens, 12 denotes a focussing glass, 13 denotes a field mask, 14 denotes a pentagonal roof prism (shown briefly like a glass block in this drawing) and 15 denotes an eyepiece. Thus, in the finder optical system of the present invention, the focussing glass 12 is arranged on the eyepiece 15 side from the field lens 11 and the field mask 13 is arranged near the focussing glass 12. Therefore, the light from the field mask 13 will be observed with the eyepiece 15 without passing through the field lens 11 and therefore a distortionless field mask image will be observed.

Figure 1:
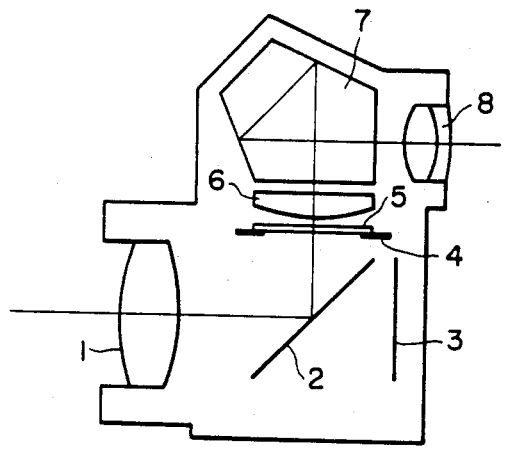
FIGS. 1 and 2 are views showing respective conventional finder optical systems.

In such optical system, the real image formed on the focussing glass by the picture taking lens is formed through the field lens 11. Therefore, this real image will be influenced by the aberrations of the field lens and particularly the curvature of field will become large. Therefore, the finder optical system of the present invention is thought to become lower in the focussing precision than the conventional optical system shown in FIG. 1. Further, there are defects that, if the thickness of the field lens fluctuates in the manufacture of the lenses, the position of the image surface will vary and therefore the position of the focussing glass will have to be corrected correspondingly to assemble the finder. However, the focussing precision is not a problem at all for the later described reason. Further, the above explained finder optical system of the present invention can be applied not only to finders for single-lens reflex photographic cameras but also to finders for measuring instruments and telescopes. In the case of such finders for optical instruments in which no focussing is made as, for example, finders for single-lens reflex photographic cameras for endoscopes and finders for telescopes, the above mentioned defects are not problems at all.

The reason why the finder optical system of the present invention has no problem in respect of the focussing precision and the like shall be explained in the following.

If the focal length of the eyepiece is represented by f, the object shifting distance $\Delta$ per diopter will be given by $$\Delta = \frac{f^2}{1.000}.$$

For example, the eyepiece of a single-lens reflex finder is of f=about 55 mm. Therefore, $\Delta = 3.0$ mm. If the amount of the above described image surface curvature and the amount of the variation of the image surface position are smaller than the amount of this $\Delta$, the influence will not be felt to the eye. On the other hand, the amount of the image surface curvature is smaller than $\Delta$ except in the case that the focal length of the field lens 11 is extremely short and the variation of the image surface position caused by the fluctuation of the thickness of the field lens is less than 0.1 mm. at most and is therefore smaller than Δ. Therefore, the influences of both described above will not be felt to the eye. Therefore, the finder optical system of the present invention causes no focussing problem.

Examples of numerical values of the finder optical system are given in the following:

| | | |
|---|---|---|
| $r_1 = \infty$ (Exit pupil) | | |
| | $d_1 = 24.297$ | |
| $r_2 = -143.1785$ | | |
| | $d_2 = 7.476$ | $n_1 = 1.6968$ |
| $r_3 = -143.1785$ | | |
| | $d_3 = 0.3738$ | |
| $r_4 = 71.1005$ | | |
| | $d_4 = 4.6725$ | $n_2 = 1.6968$ |
| $r_5 = 985.6041$ | | |
| | $d_5 = 10.8402$ | |
| $r_6 = \infty$ | | |
| | $d_6 = 3.738$ | $n_3 = 1.78472$ |
| $r_7 = 62.7479$ | | |
| | $d_7 = 4.6725$ | |
| $r_8 = \infty$ | | |
| | $d_8 = 104.664$ | $n_4 = 1.79952$ |
| $r_9 = \infty$ | | |
| | $d_9 = 0.0561$ | |
| $r_{10} = \infty$ | | |
| | $d_{10} = 5.981$ | $n_5 = 1.8061$ |
| $r_{11} = -48.9865$ | | |

Maximum image height = 13.08,
Exit pupil diameter = 15.2,
Diopter = 0.54 diopter
where $r_1$ through $r_{11}$ represent radii of curvature of the respective faces of respective lenses, $d_1$ through $d_{10}$ represent thicknesses of respective lenses and distances between respective lenses and $n_1$ through $n_5$ represent refractive indices of respective lenses.

Figure 2:
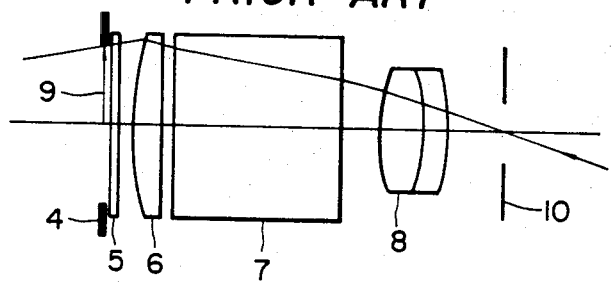
Figure 3:
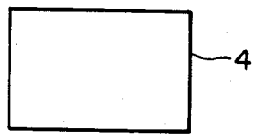
FIG. 3 is a view showing the shape of a field mask.
Figure 4:
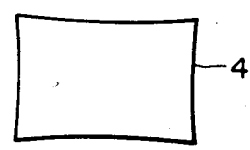
FIG. 4 is a view showing an image of a field mask by a conventional finder optical system.
Figure 6:
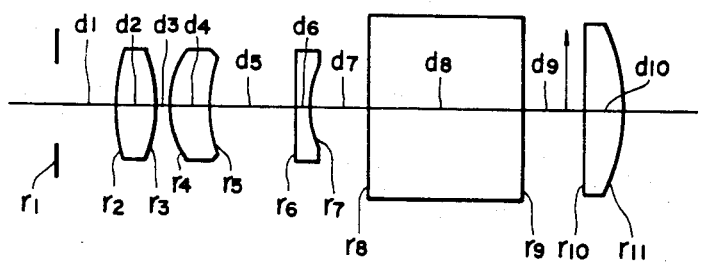
FIG. 6 is a view showing an embodiment of a finder optical system according to the present invention.
Figure 7:
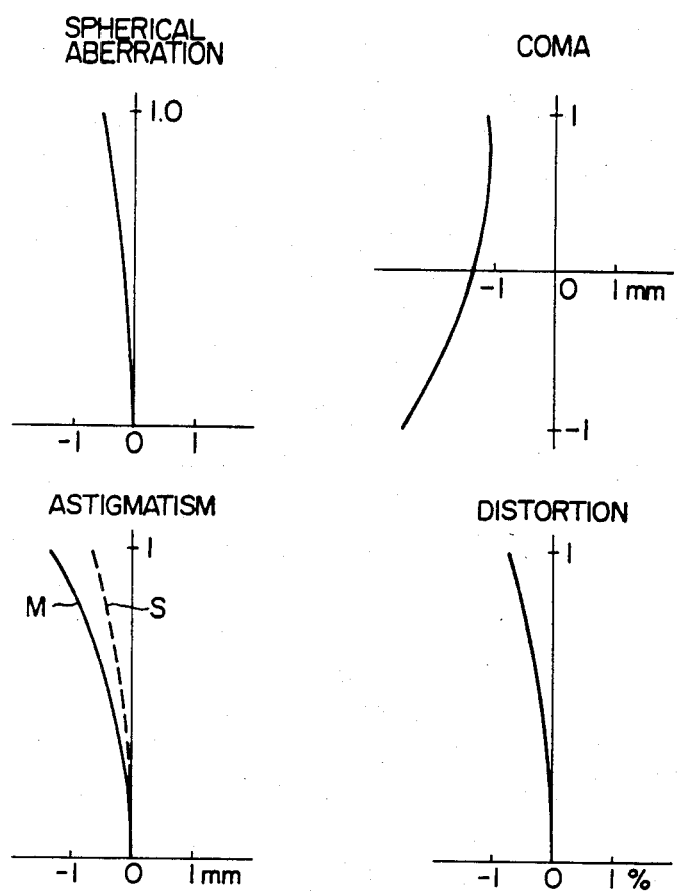
FIG. 7 shows aberration curve diagrams of the optical system shown in FIG. 6 in the case of not including the field lens.
Figure 8:
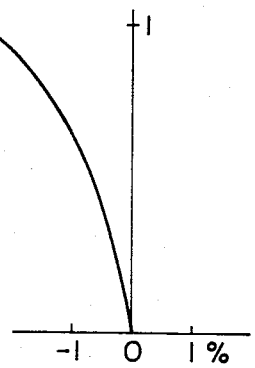
FIG. 8 is an aberration curve diagram of the optical system shown in FIG. 6 in the case of including the field lens.

The above mentioned examples of numerical values are of the lens formation shown in FIG. 6. In this drawing, the view is shown reversely to the proceeding direction of the light, the exit pupil is on the left side and from it are shown the eyepiece system, pentagonal roof prism and field lens in the order mentioned. The aberrations of this optical system are as shown in FIG. 7 (a view in the case that the light incident from the exit pupil side is formed in the position in which the image of the object is formed, that is, in the case that the field lens is removed). FIG. 8 is of a distortion in the case of including the field lens. The distortion is remarkably larger than in the case of not including the field lens as shown in FIG. 7. That is to say, in case the field mask showing the photographed range is placed on the object side of the field lens as shown in FIG. 2, the field mask will be distorted to be bobbin-shaped by the distortion as shown in FIG. 8. However, in the finger optical system of the present invention shown in FIG. 6, the distortion is so small as shown in FIG. 7 that the field mask will not be substantially distorted.

By the way, in the above explanation, the field mask is arranged between the field lens 11 and focussing glass 12. However, even in the case of an optical system wherein, as shown by dotted lines in FIG. 5, the shielding part on the peripheral side of the field lens 11 is made a field mask 13' and is used as it is or an optical system wherein the field mask 13' is formed directly on the surface on the eyepiece side of the field lens 11, the distortion will be so small that a practically distortionless image of the field mask will be able to be observed.

I claim:

1. A finder optical system comprising an objective, a field lens, a rectangular field mask placed at the image forming position by said objective, a pentagonal roof prism for bending the optical axis and an eyepiece, said objective, field lens, field mask, pentagonal roof prism and eyepiece being arranged in turn.

2. A finder optical system according to claim 1 wherein said field mask is provided on the peripheral surface of said field lens.

3. A finder optical system according to claim 1 wherein said field mask is provided on the surface on said eyepiece side of said field lens.

4. A finder optical system according to claim 1 wherein said field lens is a positive lens; said eyepiece comprises a biconvex lens, a positive meniscus lens convex toward said biconvex lens and a negative lens concave toward said roof prism; and said field lens, pentagonal roof prism and eyepiece have the following numerical data, respectively:

| | | |
|---|---|---|
| $r_1 = \infty$ (Exit pupil) | | |
| | $d_1 = 24.297$ | |
| $r_2 = 143.1785$ | | |
| | $d_2 = 7.476$ | $n_1 = 1.6968$ |
| $r_3 = -143.1785$ | | |
| | $[d_3 = 0.3738]$ | |
| $[r_4 = 71.1005]$ | | |
| | $d_3 = 0.3738$ | |
| $r_4 = 71.1005$ | | |
| | $d_4 = 4.6725$ | $n_2 = 1.6968$ |
| $r_5 = 985.6041$ | | |
| | $d_5 = 10.8402$ | |
| $r_6 = \infty$ | | |
| | $d_6 = 3.738$ | $n_3 = 1.78472$ |
| $r_7 = 62.7479$ | | |
| | $d_7 = 4.6725$ | |
| $r_8 = \infty$ | | |
| | $d_8 = 104.664$ | $n_4 = 1.79952$ |
| $r_9 = \infty$ | | |
| | $d_9 = 0.0561$ | |
| $r_{10} = \infty$ | | |
| | $d_{10} = 5.981$ | $n_5 = 1.8061$ |
| $r_{11} = -48.99865$ | | |

Maximum image height = 13.08.
Exit pupil diameter = 15.2.
Diopter = 0.54 diopter wherein reference symbol $r_1$ represents an exit pupil of said finder optical system, reference symbols $r_2$ through $r_{11}$ respectively represent radii of curvature of respective surfaces of respective lenses, reference symbols $d_1$ through $d_{10}$ respectively represent thicknesses of respective lenses and airspaces between respective lenses, and reference symbols $n_1$ through $n_5$ respectively represent refractive indices of respective lenses.

* * * * *